INVENTOR.

July 13, 1954 M. V. KALFAIAN 2,683,770

MULTIPLEX COLOR VIDEO AND AUDIO MODULATED COLOR TELEVISION

Filed May 29, 1952 9 Sheets-Sheet 2

INVENTOR.

Megur V. Kalfaian

MULTIPLEX COLOR-VDEO & AUDIO MODULATED TRANSMITTER

INVENTOR.
Mihran V. Kalfaian

July 13, 1954 M. V. KALFAIAN 2,683,770

MULTIPLEX COLOR VIDEO AND AUDIO MODULATED COLOR TELEVISION

Filed May 29, 1952 9 Sheets-Sheet 4

MODIFIED TRANSMITTER OF FIG. 3

INVENTOR.

Meyer V. Kalfaian

July 13, 1954 M. V. KALFAIAN 2,683,770

MULTIPLEX COLOR VIDEO AND AUDIO MODULATED COLOR TELEVISION

Filed May 29, 1952 9 Sheets-Sheet 5

INVENTOR.

Myron V. Kalfaian

INVENTOR.
Megerditch V. Kalfaian

SYNCHRONIZING PULSES

PHASE MODULATOR OF SYNC-PULSES

INVENTOR.

Mynas V. Kalfaian

INVENTOR.
Myer V. Kalfaian

MULTIPLEX COLOR VIDEO AND AUDIO MODULATED COLOR TELEVISION

Filed May 29, 1952 9 Sheets-Sheet 9

INVENTOR.

Megreditch V. Kalfaian

Patented July 13, 1954 2,683,770

UNITED STATES PATENT OFFICE 2,683,770

MULTIPLEX COLOR VIDEO AND AUDIO MODULATED COLOR TELEVISION

Meguer V. Kalfaian, Los Angeles, Calif.

Application May 29, 1952, Serial No. 290,723

4 Claims. (Cl. 178—5.2)

This invention relates to color television, and more particularly to provide improved methods and means for the transmission and reception of color television signals, in conjunction with the sound waves associated therewith. One object of the invention is to transmit video and audio signals over the same carrier wave without encountering video-audio cross-talk, whereby first, to eliminate the extra transmission power devoted to carrying the sound waves, and second, to eliminate critical adjustments that are usually required in tuning to two different carrier frequencies. Another object of the invention is to transmit video signals representing three primary colors over simultaneous amplitude and phase modulation of the carrier wave, whereby first, to provide accurate color selection at the receiving end without the necessity of color-synchronizing signals, and second, to provide high fidelity conveyance of the video signals by utilizing double-sideband transmission of the carrier wave. Another object of the invention is to provide improved method and means of scanning color-pictures, which according to the physiological behavior of the human eye in which it is capable of interpreting repetitious production of colored pictures, provides effectively the same amount of chromatic information on the viewing screen as it would ordinarily for monochrome pictures by the same amount of video components that are available in a given channel band. Still another object of the invention is to provide methods and means for conveying picture-synchronizing signals over phase modulation of the carrier wave, to provide greater accuracy in picture synchronization than is possible by the conventional serrated waveform. A further object of the invention is to provide methods and means adapted to receive the particular type of transmission employed, whereby to provide a complete system of color television.

In the present multiplex system, the total number of video components that may be transmitted per second in a channel band of 6 megacycles, is 6 million (less the number of video elements that would occupy in the spectrum band of the sound waves), in contrast with the 8 million components that may be conveyed over vestigial-sideband transmission. Such an amount of reduction in elemental video components however, does not indicate degradation of the reproduced picture any more than the picture reproduced by the presently standardized vestigial-sideband system, since, while image-resolution is reduced by a given amount, image-fidelity is increased by a multiple amount; especially in color reproduction. For example, true reproduction of natural color pictures is dependent upon the superposition of different primary colors having definite brightness levels. Such high fidelity signal conveyance is not possible with the presently standardized vestigial-sideband transmission. In this type of modulation, the high frequency amplitude variations must first be pre-distorted at the transmitting end in comparison with a standard receiving set, so that the reproduced picture at the receiving end may be intelligible. Even with such monitoring, the ideal amplitude correction cannot be realized; although it may be satisfactory for monochrome television. Such degradation of color images (in vestigial-sideband system) will be especially emphasized when the original signals are passed through relay channels. However, aside from high fidelity signal transmission, the type of color-image scansion employed herein will provide ample amount of color-image information.

In reference to the U. S. standard of 6 megacycle television band, utilizing vestigial-sideband transmission, the maximum number of image elements that may be transmitted is 8 million per second. With the standard frequency rate of 30 frames per second, this amount of image elements will produce visually acceptable monochrome pictures. But in color television, each image element must be reproduced in three primary-color components, which reduce the total number of image elements to about 2.7 million per second. While this reduction of image elements will apparently impair the image-resolution of monochrome pictures, it is assumed (according to actual tests) that the presence of colors will somewhat compensate for the loss of image detail. Physiological aspects of the human eye have been considered, and accordingly various methods of constructing color pictures on the viewing screen have been proposed, in order to effect maximum pictorial detail utilizing whatever amount of image or color is available in the standard 6 megacycle channel band; of these methods, the presently standardized field-sequential system and the National Television System Committee's oscillating color system are of current issues. Each of these systems has a different advantage over the other. For example, the former is theoretically capable of producing true-color pictures with reduced image detail, while the latter is capable of rendering fine image detail but with reduced color detail. The latter system is based upon the assumption that the eye cannot distinguish between monochrome images in the fine detail, under usual viewing conditions. Such an assumption however may apply only to moving objects, as the eye is definitely capable of seeing fine color-detail in stationary objects; and under usual conditions most of the viewing screen comprises stationary objects.

To briefly differentiate various conditions in which the eye is capable of seeing colored pictures, assume that a moving colored-object is produced on the viewing screen in its first primary-color at the first moving-position; in its second primary-color at the second moving-position; and in its third primary-color at the third moving-position. In the case that the object covers a large viewing-area with few high-lights, the eye can easily distinguish the object in all three positions in three separate colors; with some rendition of the three-color hue. This may be proven by the fact that, in the field-sequential system the eye will see a solid color (red being most prominent) for a brief period of time, whenever a diversion to and from the picture-screen is made; even though the colors change at the extreme rapid rate of 144 fields per second. However, when the object has intricate color detail, the eye cannot interpret the differences of color in elementally adjacent areas, and will average out into a new color. On the other hand, if the object has no movement of its own and moves steadily against a stationary background scene, the eye can follow its movement very easily, and therefore, the eye can see all the color-detail as if it were stationary on the screen. For example, the pictorial detail of the body of a running horse can be easily seen, but the legs will appear as a blurr. It follows therefore, that the eye can definitely see fine-detail in stationary objects, whether it be in color or black and white; and can definitely see separate primary-colors of massive objects in moving positions; but cannot detect fine-detail in moving objects. Under these viewing conditions, it is obvious therefore that, in field-sequential system the color-sequence cannot possibly be reduced below the presently practiced frequency rate of 144 fields per second. Similar inefficiency will be had if all the image elements were scanned and conveyed in simultaneous primary-colors. The reason for this inefficiency is that, constructing each image element in three primary-colors in such a short elemental time is a waste, because the eye cannot respond to elemental changes in color or image, at a frequency rate of 10 per second; in contrast with the 144 massive color-fields per second. Thus by taking advantage of such behavior of the human eye, we may scan the color picture in the same monochrome fashion, but each successive image-element in one of its primary-color, and different from the primary-color of an adjacent image-element, so as to effect mutual color-aid elementally in visually forming chromatic picture in a single scanned-frame, by substantially all the image-elements that would normally be available for monochrome picture in a single picture-frame. Then, by reversing the sequence of elemental primary colors on the succeeding second and third frame periods, each image element is further resolved into its full chromatic value. Adhering to the standard 30 frames per second, each image element is constructed in its final color in one tenth of a second. But this rate is not visually slow, because the whole picture is still constructed in 1/30 second, and each picture-frame will in most part appear in full-color by way of the elementally-different adjacent colors, since, as stated above, the eye resolves elemental colors into massive colors while the object is in motion; even in the slow frequency rate of $\frac{1}{10}$ second without flicker or twinkle of image or color. Thus by comparing the final results obtained with that of the previously proposed color systems: the field-sequential color system will provide maximum 3 million image elements per second, with equal amount of color resolution; the oscillating color system (mixed-highs) will provide maximum 8 million image elements per second, with one fourth that amount of color resolution; and the presently proposed system will provide maximum 6 million image elements per second, with equal amount of color resolution, plus high fidelity in color and image, without cross-talk in color; image, or smear of any kind, under all operating conditions.

Owing to the fact that simultaneous amplitude and phase modulation is employed with the present system, there is provided a color-sequence reversing switch, so that the sequence of phase-modulated signals may be reversed at elemental scansion intervals, in order to convey the signal of whichever primary color (second or third) is present at an elemental time. To describe the purpose of this operation, it may be assumed that in all color television systems each image element will contain a maximum of three primary-color components. If it were the case that every one of the image elements had contained all the primary colors simultaneously, then the time allotted to convey these components in any color-system would be utilized at the maximum efficiency. However, such is not the case in colored-pictures, and in the major part of one picture-frame the majority of elemental images will contain only one or two primary colors simultaneously. Hence, the time allotted for conveying the missing colors will be completely wasted, and result in poor image detail. In order to utilize most of the time allotted for conveying the three primary-color components, advantage is taken of the fact that, simultaneous amplitude and phase modulation will provide three-way selectivity of the video signals, for example, by assigning amplitude modulation to convey video components of the green color; assigning phase modulation of the carrier in forward direction to convey video components of the blue color; and assigning phase modulation of the carrier in backward direction to convey video components of the red color. Then, by employing a color sequence-reversing switch (instantaneous in action), the sequence of video components of the blue and red primary colors may be changed at any random elemental scansion period, to transmit the signal of whichever color is present at that time, thereby utilizing greater portion of the time that is available for transmitting video signals in a given channel band. When an image element consists of three primary colors, the third color is produced during the succeeding frame period, by simply reversing the transmission time-sequence of the red and blue primary colors.

Fig. 1 shows how the color-sequence is reversed elementally. As an example, assuming that in the first original image-element of the first frame the blue color is normally assigned to be transmitted, the reproduced image will contain green and blue primary colors. Then, by reversing the sequence of this assignment in the succeeding frame, the same image element will be reproduced by the green and red primary colors, in order to visually effect the original three-color hue. Similarly, in the second image element, consisting of only two primary colors, the red primary color is produced during the first frame period, and the blue primary color during the second frame period. The third and fourth image elements are other examples, where the two primary colors are produced simultaneously in each succeeding frame period. It will be noted however that when the red and blue primary colors are present simultaneously in an image element, some saturation control must be included in the system, as the time of phosphor excitation allowed at the receiving end for these colors will be less than the time allowed in other color-combinations. Since the storage characteristics of color phosphors may be fixed by standardization, the magnitude of saturation control may be fixed, depending upon whether the red and blue primary colors are present simultaneously or not.

In accordance with the presently proposed color-image scansion system, Fig. 1a shows the normal arrangement of elemental color-sequence as produced on the viewing screen. The first frame shows elemental images reproduced individually in different primary-color components; in the second frame the same image elements are reproduced individually in still different primary colors; and in the third frame elemental images are finally constructed in their three-color hues. It will be noted however that, at the end of the first three frames every second succeeding image element will still contain two primary colors; this sequence being altered during the second three frames, such as shown in the last two rectangles of the drawing. Since according to the color-sequence shown the scansion of green (or other prearranged color) primary color is repeated in every other elemental area, a saturation control is also provided for this color; which can be of a fixed value. With the inclusion of the color-sequence reversing switch, as mentioned above, the color sequence as shown in Fig. 1a will vary (the condition of which will further add to the picture quality), since in the absence of one elemental color the other color will be scanned instead. As shown in the drawing, the number of elemental images in either horizontal or vertical direction is adjusted to be 4N+1. With such dot scansion, it will be noted that none of the primary colors draws a straight line in any direction on the picture frame to cause any possible line crawl.

The type of multiplex modulation utilized herein also provides convenient transmission of the picture-synchronizing signals over phase modulation, which is capable of conveying frame and line synchronizing signals that are each sharply distinguished from the other. For example, phase-advancing of the carrier wave represents horizontal sync signal; phase-retarding of the carrier wave represents vertical sync signal, namely for even-line scanning; and a succession of phase-advancing and phase-retarding of the carrier wave represents vertical sync signal, namely for odd-line scanning.

Briefly, in view of the foregoing information, and in its simplest mode of operation, there is produced at the transmitter a time-dividing sine wave, at 3 megacycles per second, which is first frequency-modulated by the sound wave. From the scanned picture, there are derived elemental image components whose successive time lengths are equal to the successive time lengths of one-cycle periods of the frequency modulated sine wave. Two simultaneous image signals are derived during each one-cycle period of the sine wave, so that the total number of video signals produced is 6 million per second. The frequency-modulated sine wave is caused to time-divide the carrier wave into 3 million individual envelopes, of which the peak amplitude of each succeeding envelope is shifted by the first of the two simultaneously derived video signals, and the carrier phase in that envelope is shifted representative of the second video signal; the direction in which the phase is shifted being dependent upon the primary color (second or third) that the image is to be conveyed in that elemental period. Thus, the carrier is produced in successive trains of individual envelopes, whose time lengths are varied representative of the sound waves; the peak amplitude of each envelope is varied to convey an image signal of the first primary color; phase angle of the carrier wave in each second envelope is shifted in forward direction to convey an image signal of the second primary color; and phase angle of the carrier wave in each other second envelope is shifted in backward direction to convey an image signal of the third primary color. In addition, peak amplitude of the carrier envelopes is shifted above an assigned limit during picture retrace periods, so as to convey the picture synchronizing signals over phase modulation, as mentioned above.

It will be noted that frequency-modulation of the 3 megacycle time-division (sub-carrier) wave will vary the spot size of the scanned image elements. However, such variation of the elemental image size is very small to be of any concern. For example, if the frequency deviation on either side of the 3 megacycle sub-carrier wave is maximum 20 kc., then the maximum change in elemental image size will be limited to 1/150 of the original size, which obviously will not effect any dot structure of the picture. During each successive frame period, an image element might be scanned away from the same image element in a preceding frame, by a maximum distance of half an image element. But such a shift of scansion time does not indicate image cross-talk, because the same amount of scansion shift will take place inherently at both transmitting and receiving ends in accurate synchronism. Thus, conveyance of sound waves over the video sub-carrier will not effect audio-video cross talk of any kind, and each signal will retain its original high fidelity quality.

With such multiplex modulation, and in observance of the standard 6 megacycle channel-band limitation, special sampling and waveshaping is employed with the present system, an analytical view of which is given in the following.

In the general mode of time-division transmission, where the carrier $f_c$ is interrupted abruptly at a sub-carrier frequency $f_m$, and the modulation wave having frequencies not exceeding $f_m/2$ is carried over the peaks of the interrupted envelopes, the sidebands repeat successively in complementary pairs around the carrier; occupying frequency spaces between $f_c \pm f_m$, $f_c \pm 2f_m$, $f_c \pm 3f_m$ etc., with gradually diminishing amplitudes. Such expansion of sidebands may be narrowed to the regions of the first pair by waveshaping the amplitude rise and fall at the boundaries of each time-divided envelope to the simple curve of the sine-squared function. However, even with such waveshaping of the carrier envelopes, the modulation frequency is limited to $f_m/2$ in a bandwidth of $2f_m$, because the modulation wave is conveyed only over the peaks of the envelopes. In other words, the time of signal resolution allowed is twice the time period that is normally required in the alternating type of modulation (signals carried over positive and negative alternations of the carrier envelopes); causing a waste of useful bandwidth. This loss of information may be filled in, by simultaneously modulating the carrier phase by a second modulating wave. In this case again, ordinary type of phase modulation will cause effective frequency modulation, by changing the time periods between the zero crossings of the carrier cycles, and consequently result in swinging sidebands. In order to avoid such added sidebands, the carrier phase may be shifted stepwise; changing abruptly at the boundaries of each envelope; provided that the carrier amplitude is held substantially zero at the boundaries, so as to avoid sudden transient changes of the carrier cycles between adjacent envelopes. Further, in order to obviate the necessity for a reference carrier at the receiver, for detection purpose, the carrier may be shifted stepwise in each succeeding time-divided envelope, representative of intelligence, by a difference-angle that is measurable from a preceding angle, whereby each preceding phase angle represents a reference angle to a succeeding step of the carrier phase. Detection of this type of phase modulation is achieved by passing the incoming carrier wave through two separate circuits of dissimilar decrements, and comparing the dissimilar phase angles of their carrier outputs as a function of the original intelligence. The sideband restrictions may be analyzed as follows.

*Side-frequency-wave and bandwidth*

In pure amplitude modulation, the behavior of side-frequency-wave as produced by the carrier wave, and bandwidth as occupied by information, are characteristically different one from the other. The first is manifested to be effected by the time shift of the carrier wave maxima, and the second is determined by the frequency rate at which the carrier amplitude changes. The second case may be explained briefly (for comparison purpose) by an example of sinusoidal modulation, where composite frequencies are represented by the fundamental and two complementary side frequencies. As is well known, a sharply tuned circuit will respond maximum when resonated at any one of these three frequencies, but negligibly minimum at all other frequencies. When the resonance of the circuit is tuned close to the fundamental, the carrier cycles assume an in-phase resolution with the resonant frequency of the circuit for a considerable length of time, and contribute an oscillatory excitation therein. However, the carrier cycles gradually become out of phase with the free oscillation of the tuned circuit, and (because of symmetry in amplitude reversal) cancel out the original contribution. With the assumption that the resolution time constant of the circuit is low, compared with the time of phase reversal, the magnitude of stored oscillation at the output will be negligible. When the circuit is continually tuned away from the fundamental, the length of time during which such contribution and cancellation occurs becomes less and less, until at side-frequency point (where this time-period constitutes one cycle of the modulation frequency), the tuned circuit displays a sharp response to the carrier (side frequency), which evidently is not due to the amplitude-change of the carrier, but some other phenomena that represents frequency change. This phenomena may be explained as in the following.

*Side-frequency-wave*

In the simple case of pure amplitude modulation, the zero crossings of the carrier wave are spaced equally, and therefore, the carrier represents fundamentally a single frequency. However, in the act of amplitude change, the maxima of the carrier half-cycles shift from normal time positions, which behave as though the carrier half-cycles were changing in time, and possessing additional frequency components. Accordingly, a modulated carrier voltage has essentially two components, one emanating from the carrier voltage without experiencing time shift of the maxima, and one emanating from the carrier voltage that experiences these time shifts.

The power derived from the carrier voltage that experiences time shift of the maxima is attributed to the side-frequency-waves, since in their absence this voltage is also absent. Hence, if we determine the output of this power, we will determine the power contribution of the side-frequency-waves at any given instant.

The carrier voltage that experiences these time shifts may be found by writing the modulation voltage, as:

$$e=(a+b\cos\theta_m)\cos\theta_c \qquad (1)$$

where $\theta_m$ and $\theta_c$ are the instantaneous phase angles of the sinusoidal modulation envelope and the carrier respectively, while $a$ and $b$ are constants. In general, $b$ is smaller or equal to $a$, and therefore, we may write Eq. 1, as:

$$e=a(1+K\cos\theta_m)\cos\theta_c \qquad (2)$$

To find the positive and negative shift of the maxima, we may differentiate Eq. 2 and set the derivative equal to zero.

$$\frac{de}{dt}=-a(1+K\cos\theta_m)\sin\theta_c\frac{d\theta_c}{dt}-aK\sin\theta_m\cos\theta_c\frac{d\theta_m}{dt}=0 \qquad (3)$$

$$\frac{d\theta_m}{dt}=2\pi f_m$$

and $$\frac{d\theta_c}{dt}=2\pi f_c$$

Accordingly, Eq. 3 may be simplified and solved for $\theta_c$, as follows:

$$\tan\theta_c=-(f_mK\sin\theta_m)/f_c(1+K\cos\theta_m) \qquad (4)$$

$$\phi=-\arctan\{(f_m/f_c)\ (K\sin\theta_m)/(1+K\cos\theta_m)\} \qquad (5)$$

where $\phi$=lateral shift of the maxima from normal. By further simplifying Eq. 5:

$$\phi=\arctan(Kf_m/f_c) \qquad (6)$$

$$f_m=f_c\tan\phi/K \qquad (7)$$

Equation 7 shows that the term ($f_c\tan\phi/K$) is the added carrier component that experiences time shift of the maxima. Therefore, the fundamental carrier contains plus and minus this component, which contributes to the side-frequency-waves.

Since ($f_c \tan \phi/K$) is equal to the impressed modulating frequency $f_m$, we may determine the power contribution $P_s$ of this component at a given instant, by first writing the instantaneous voltage and current of $f_m$, as:

$$e_m = KE_m \sin \omega_m t,\ i_m = KI_m \sin \omega_m t \quad (8)$$

The power $P_s$ may be written by multiplying the two terms of current and voltage, as:

$$P_s = KE_mI_m \sin^2 \omega_m t \quad (9)$$
$$= K\tfrac{1}{2}E_mI_m(1 - \cos 2\omega_m t)$$

The average value of ($\cos 2\omega_m t$) is zero, hence the average value of power is:

$$P_s = \tfrac{1}{2}E_mI_m \quad (10)$$

Equation 10 agrees with the average value of power generally given for side components. However, Eq. 9 shows that the frequency associated with the power arising from the side-frequency-wave is twice the frequency of the impressed modulating voltage. Moreover, it shows that the power of side components is maximum at the steepest part of the modulating envelope. Accordingly, the phase relations of the instantaneous power output of the carrier and side components may be shown graphically as in Fig. 11, wherein *a* illustrates the condition existing in 100% modulation, and *b* in 50% modulation.

It will be noted that the magnitude of carrier power $P_c$ varies from a fixed reference level equal to one, whereas, the power $P_s$ arising from side component varies from zero level. In other words, the power output of side component is 100% modulated at frequency $2\omega_m$, regardless of the modulation ratio K. This shows that the side components are not independent carriers as traditionally presented; if they were, the magnitude variations at frequency $2\omega_m$ would cause further pairs of their own side-frequency-waves. The side components are merely possessed by the carrier wave when changed in magnitude from one steady state to another, in the form as indicated by Eq. 7.

Fig. 12 shows one form of amplitude modulation, where the rate of amplitude change from one steady state to another is kept constant at a fixed time period $t_m$. In this case, there appears only one pair of complementary side-frequency-waves, and the shape of their power envelopes are indicated by the dotted lines. However, a modulation waveform such as shown occupies a bandwidth covering the entire space between the two side frequencies, even though the side-frequency-waves remain constant without side swings.

Here, the difference between side-frequency-wave and bandwidth is readily distinguished by the fact that, the first is manifested by the time shift of the carrier wave maxima from normal position, and the second is manifested as a consequence of dissymmetric contribution and cancellation of the carrier to the tuned circuit during a given time.

*Simultaneous AM and PH modulation*

With reference to the foregoing, and in the ideal unity modulated example, each envelope of the carrier may be practically considered as an independent carrier unit without relationship to either preceding or succeeding units; provided its normal shape remains constant. Then again, since at the trough of the modulation envelope, both the side and carrier powers are practically zero, it matters not at what phase the carrier commences in each envelope; provided that the phase remains constant from boundary to boundary. Thus, these units may be transmitted without changing conditions of bandwidth and side-frequency-waves as previously described, by steady state sampling and waveshaping method as shown in Fig. 13, wherein, each envelope of the carrier carries simultaneous amplitude and phase representations of elemental informations. Fig. 14 shows how the side-frequency-waves remain fixed without side swings, and the total bandwidth that is occupied by video modulating waves between $f_{cv} - f_m$ and $f_{cv} + f_m$.

*Reception*

As stated in the foregoing, the length of time that is devoted to convey an elemental image-signal over amplitude modulation is one complete envelope period of the carrier wave, e. g., $3\times10^{-6}$ second. This condition indicates that the band-pass of the receiver may be 3 megacycles, instead of 6 megacycles wide, since the IF voltage need only to follow the peaks of the envelopes. However, when phase modulation of the carrier (of the type described) is included, the delayed action of phase resolution from envelope to envelope will cause envelope distortion, since the oscillatory energy in the low-decrement circuit will not be zero at the end of each succeeding envelope, and it will take some time before it resolves to the phase angle of the carrier in the following envelope; especially when the amplitude of the following envelope is much lower than the preceding envelope. To obviate such carrier-phase delay, the low-decrement circuit is divided into two branches, the oscillatory energies in which are periodically built up and dissipated, e. g., during one envelope period the incoming IF carrier is passed through one resonant circuit to build up in amplitude proportionally, while at the same time the stored oscillatory energy in the other circuit is dissipated by force, and vice versa. Since the alternate switching of these two branches should take place during one cycle periods of the frequency-modulated sub-carrier wave, the switching wave is derived from the selected channel by first passing the IF carrier through a circuit having a band-pass just narrow enough to reject the adjacent channel; second, detecting the amplitude modulation of the sub-carrier frequency of this output; third, amplitude limiting it, so as to obtain constant amplitude sub-carrier wave; and finally passing the output through a high Q circuit tuned to the sub-carrier frequency (3 megacycles), just wide enough to pass the frequency deviation that is effected by the original audio modulation. In this case, the envelope distortion of the carrier wave (due to phase modulation by the video signals) will not cause distortion of the frequency modulated sub-carrier wave, because the high frequency envelope-distortion will be canceled out by the high Q circuit. Since output of the high Q circuit contains the frequency-modulated sub-carrier wave, the sound waves are also derived therefrom by a conventional frequency discriminator circuit.

The type of reception just described indicates that the side-frequency-waves of the adjacent channels may be interposed to conserve spectrum band. This would be possible if the carrier envelopes of the immediate adjacent channels arrived at the receiving end in phase with the selected-channel carrier envelopes, so that during an envelope build-up period the phase angles of the unwanted carriers remain unchanged for their complete cancellation. However, such a condition is not possible due to propagation delay through space, and accordingly, the frequency separation between adjacent channels is equal to twice the sub-carrier frequency, plus the frequency swing that is devoted to convey the sound waves, as described in the foregoing.

In view of the foregoing description of sideband behavior, and the method by which bandwidth of a time-divided carrier may be narrowed to restricted frequency regions, reference will now be made to methods and means by which modulation of the carrier wave may be controlled to meet the above stated requirements. In the drawings:

Figures 11 to 14 are graphs, descriptive of the sideband theory included with the present invention.

Figs. 1 and 1*a* illustrate scansion sequence of elemental images in different primary colors, in accordance with the present invention.

In Fig. 2 at A there is shown the waveform of the modulated carrier in accordance with the invention, and the drawings at B to E illustrate the steps in which the carrier is modulated in its final form.

*Steps in which the carrier envelopes are produced*

Figure 2:
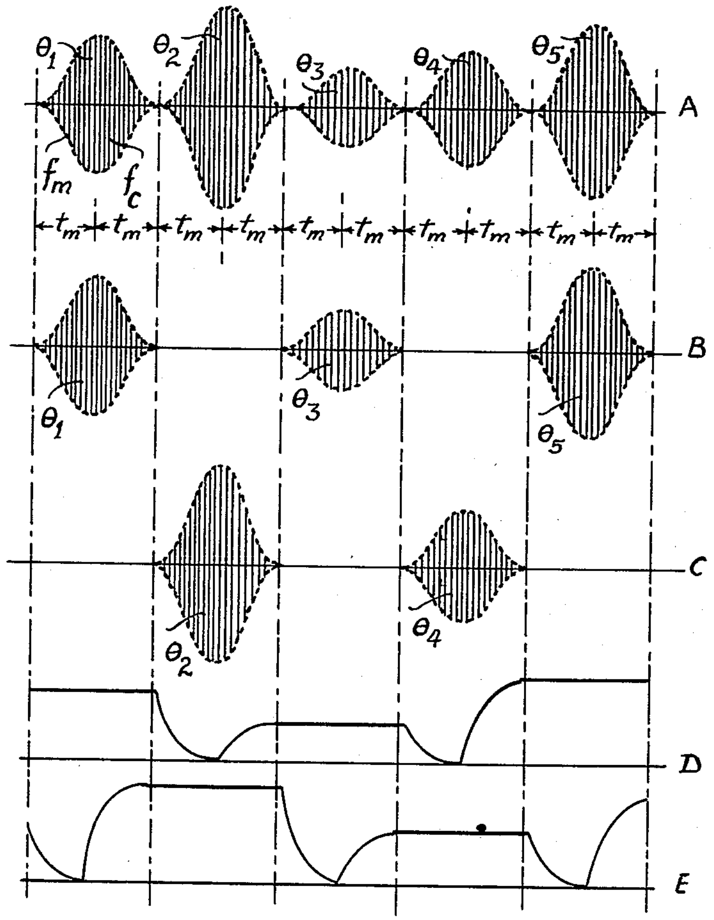

In order to modulate the carrier in the illustrated form of A in Fig. 2, the carrier wave is produced in two separate channels, and the outputs of these two channels are gated in alternate sequence at the time-dividing frequency, so that during the quiescence of each channel the carrier envelope is waveshaped and simultaneously amplitude and phase modulated, by sampling method, and finally the periodic outputs of the two channels are combined for final transmission. For example, at the output of the first channel, the periodic carrier envelopes at B are produced, and at the output of the second channel, the periodic carrier envelopes at C are produced. Then by combining the periodic carrier envelopes at B and C, the desired waveform as shown at A is obtained. The peak amplitudes of the periodic envelopes of the carrier wave at B are determined by the steady state sampled voltages shown at D, and the peak amplitudes of the periodic envelopes of the carrier wave at C are determined by the steady state sampled voltages shown at E. The manner in which the carrier phase in each envelope is shifted in a steady state step will be described by way of the transmitter shown in block diagram of Fig. 3.

*Phase and amplitude modulated transmitter*

Figure 3:
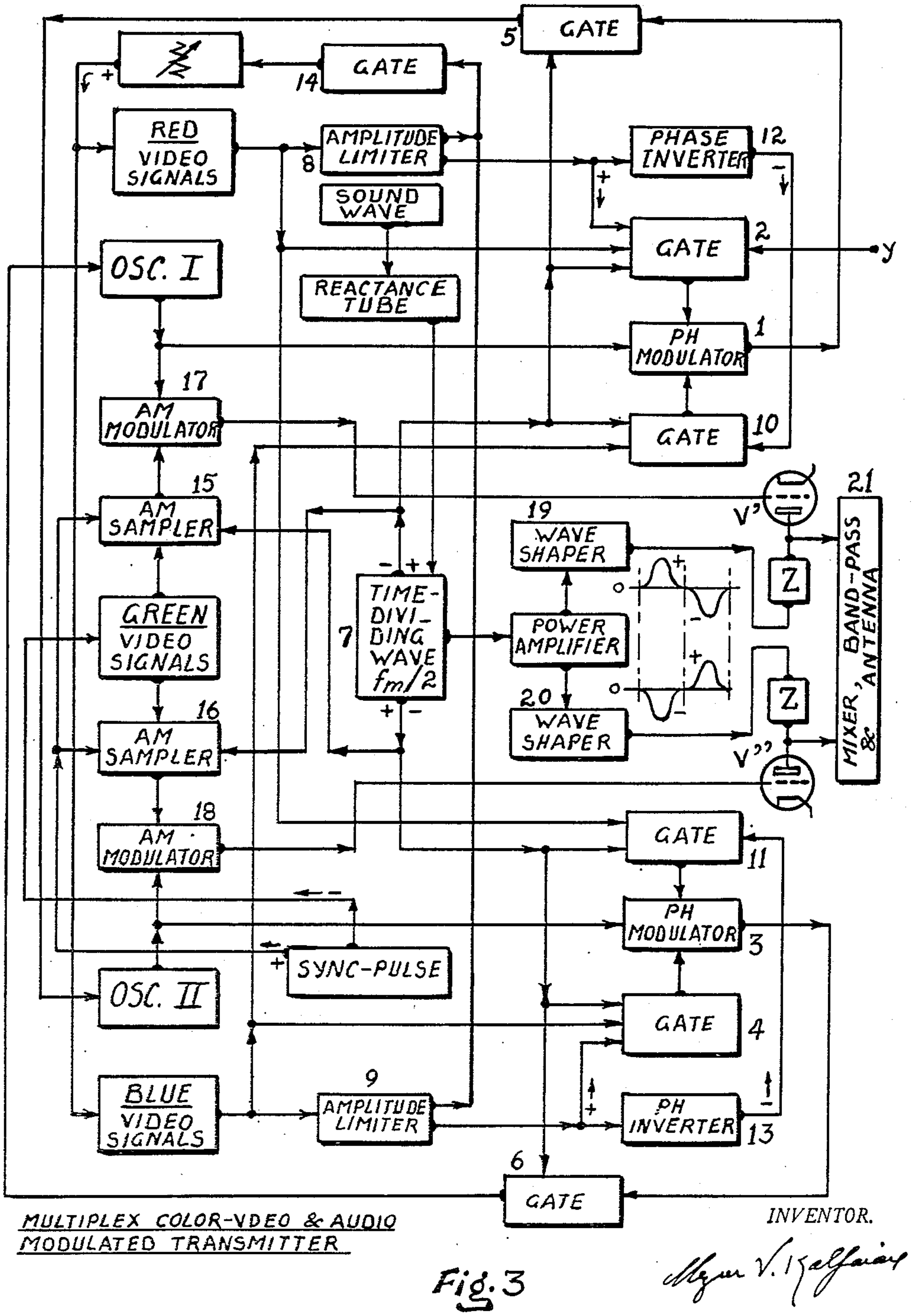
Fig. 3 is a block diagram of the transmitter in accordance with the invention.

In the case where two primary-color components of a single image element are to be conveyed over each time-division of the carrier wave, the transmitter in Fig. 3 is given. In this arrangement, the carrier wave is produced by two independent low Q oscillators I and II, both of which oscillate at the carrier frequency. The phase angle of oscillation I is shifted periodically in phase modulator 1, by signals arriving from the red video source, through normally idle gate 2, while the phase angle of oscillation II is shifted periodically in alternate sequence with the former, in phase modulator 3, by signals arriving from the blue video source, through normally idle gate 4. The phase modulated oscillations I and II are applied upon each other periodically in alternate sequence, to forcefully shift each other's phase angles, by angles representative of red and blue video signals, measurable from phase angles that the oscillations I and II had resolved in immediate preceding intervals. This operation is performed by cross-applying the phase modulated oscillations I and II through normally idle gates 5 and 6, which are operated in periodic sequence by the alternate half-cycle waves of the switching wave at frequency $f_m/2$, generated in block 7. This switching wave also operates the gates 2 and 4 in alternate sequence, so that the red and blue video signals are admitted therethrough and modulate the phase angles of oscillations I and II in phase modulators 1 and 3. Ordinarily the gates 2 and 4 would not be necessary, but they are included for the purpose of reversing the time-sequence of red and blue video-signal modulations when the color-signal assigned to an elemental scansion time is absent, so that the other color-signal can be transmitted instead. Prior to the switching operation however, the time-dividing wave $f_m/2$ is first frequency modulated by the sound wave, for example, by a reactance tube, as shown by the block diagram, so that sampling periods of the video signals will vary in exact synchronism with the final frequency-modulated sub-carrier wave; in this case, the sub-carrier $f_m$ being obtained by doubling the frequency of frequency-modulated wave $f_m/2$. This performance is achieved as follows:

The red and blue video signals are passed through amplitude-limiters 8 and 9, the output voltages of which determine whether the input signals are present or not at any given instant. Due to limiting action, the output voltages of limiters 8 and 9 are of constant amplitudes, which are applied separately upon the gates 2 and 4. The input cut-off bias voltages of gates 2 and 4 are so adjusted that, they operate only when positive voltages from limiters 8 and 9, and switching wave $f_m/2$ arrive at their inputs simultaneously. Thus, when both red and blue signals are present simultaneously during an elemental scansion period, the modulation sequence proceeds as normally assigned. Reversal of this sequence is achieved by cross-application of the red and blue video signals upon phase modulators 1 and 3, through gates 10 and 11. These gates are operated by the alternate positive voltages from block 7, but are normally prevented from operation by negative voltages arriving from the outputs of limiters 8 and 9, through phase-inverters 12 and 13. Accordingly, when both red and blue video signals are present simultaneously during an elemental scansion period, the gate 2 or 4 operates to transmit the normally assigned color-signal. But when this assigned color-signal is absent, either gate 10 or 11 is caused to operate, which in turn effects carrier-phase modulation by the other color-signal. Thus, almost all of the elemental scansion periods are utilized for transmission, which otherwise would be lost in regular sequential transmission.

For color switching, the signals of video red color advance the carrier phase, and the signals of video blue color retard the carrier phase, so that color-signals may be selected automatically at the receiving end.

As explained previously, when during an elemental scansion period both the red and blue video signals are present simultaneously, a saturation control must be included in the system. Since this control is fixed, and need only be on or off during an elemental scansion time, the output voltages of limiters 8 and 9 are passed additively through gate 14 to control the gain of red and blue video sources; the bias of gate 14 being so adjusted that it operates only when the limiters 8 and 9 are active simultaneously.

Figure 12:
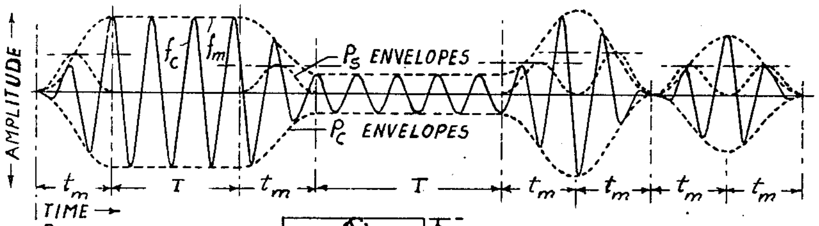

For combined phase and amplitude modulation, the periodic steady state phase modulated portions of oscillations I and II are further amplitude modulated in steady state steps by video signals of the green primary color. The original video signals of green primary color are sampled in AM-samplers 15 and 16 periodically (as shown at D and E in Fig. 2) in phase with the steady state phase modulated portions of the oscillations I and II, so that these periodic portions are simultaneously amplitude modulated in the AM-modulators 17 and 18, by the video green signals. Thus, the outputs of modulators 17 and 18 contain simultaneous amplitude and phase modulated carrier, in alternate steady state steps at the time-dividing frequency rate. The outputs of these modulators are independently applied upon the grids of gate-and-amplitude modulator tubes V′ and V″, which are normally rendered inoperative. The plate voltages of these tubes are alternately supplied by the wave $f_m/2$, which is amplified and waveshaped, such as indicated by the waves next to the waveshaper blocks 19 and 20. These alternately variable plate voltages operate the modulator tubes during those periods in which the input carrier oscillations are modulated in steady state steps, and sequential envelopes of the carrier appear across the plate tank circuits of these tubes, which are then mixed in block 21, to obtain the carrier wave in the form as shown at A in Fig. 2. For final waveshaping of the carrier envelopes, reference may be made to a special type of waveshaper and modulator circuit (Fig. 12) disclosed in my Patent No. 2,558,489 June 26, 1951.

*Modified arrangement of the transmitter*

Figure 4:
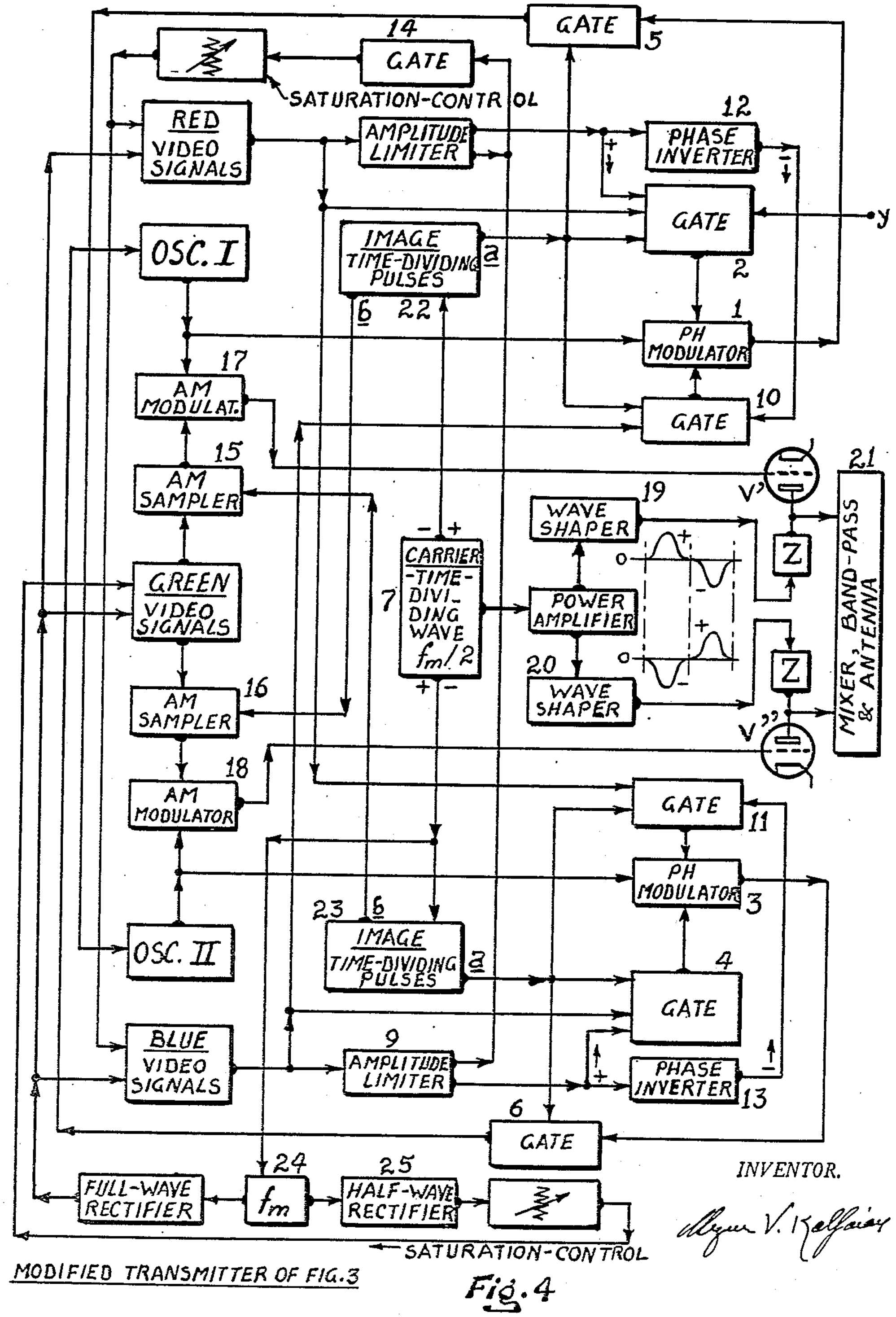
Fig. 4 is a modified arrangement of same.
Figure 5:
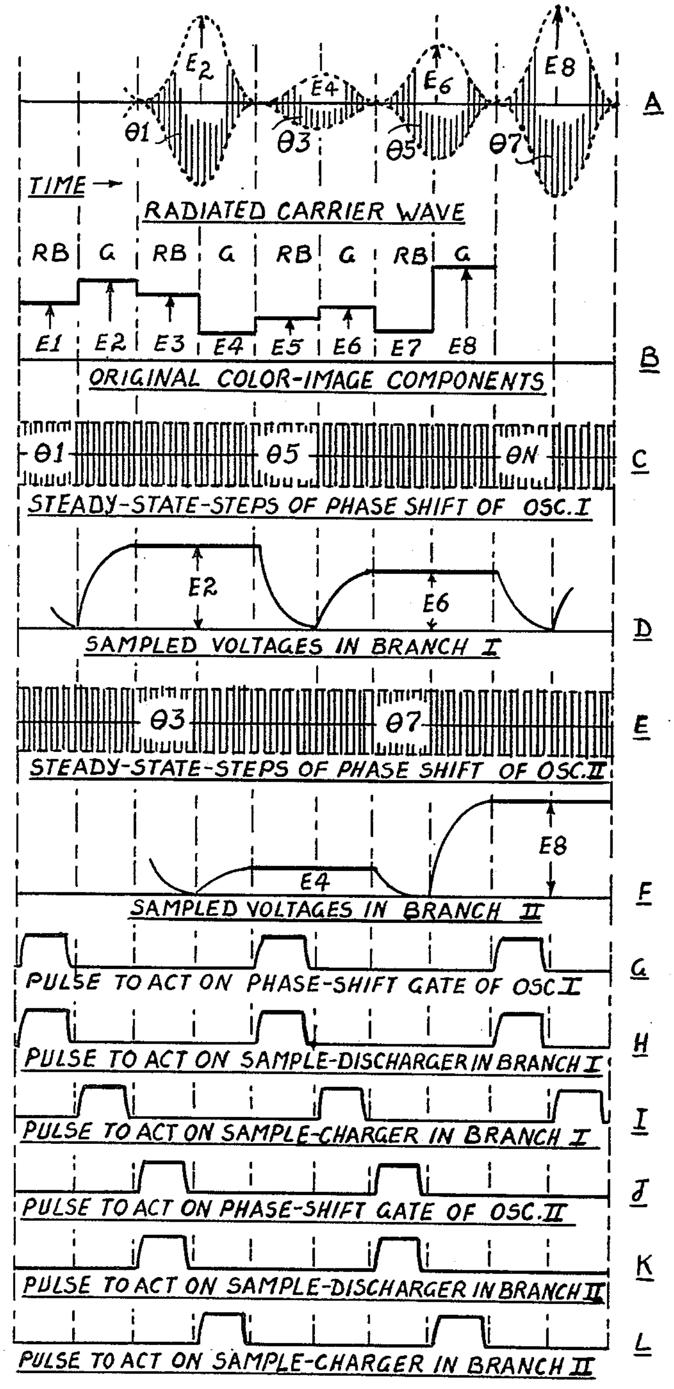
Fig. 5 illustrates various waveforms describing the operation of Fig. 4.

As explained above, the block arrangement of Fig. 3 will provide for conveying two color-components of an image element simultaneously during each carrier-envelope period. Instead, as in preferred embodiment of the invention, when each carrier envelope is to convey color components of two image elements simultaneously, then the modified arrangement of the transmitter in Fig. 4 is employed, the operation of which is described by way of the illustrated graph diagram in Fig. 5. In the latter illustration, statistic magnitudes of the camera pick-up color-components of image elements are shown at B, wherein, each odd-section represents either red or blue primary color of the image element, while each even-section represents only green primary color of the image element; this color-sequence being reversed from line to line, as described in the foregoing. Prior to production of the first carrier-envelope at A, the color components E1 and E2 at B are sampled and stored, so that both the carrier phase and peak amplitude of the first envelope are modulated by these signals. More specifically, during the time period of E1 at B, the phase of carrier oscillation I at C is shifted by a representative angle θ1, and continues oscillating at that phase thereafter. During the time period of E2 at B, the sampler at D (such as the sampler 15 in Fig. 3 or 4; various numerals being repeated in Fig. 4, for comparison of like parts with that of Fig. 3) stores a voltage equal to E2. Then, during the first carrier envelope at A, the carrier oscillation I at C, oscillating constantly at angle θ1, is amplitude modulated by the steady state voltage E2 at D, and finally envelope-shaped, such as shown by way of the arrangement of Fig. 3 or 4, for radiation.

During the time period E3 at B, the phase of carrier oscillation II at E is shifted by a representative angle θ3, and continues oscillating at that phase thereafter. During the time period E4 at B, the sampler at F (such as the sampler 16 in Fig. 3 or 4) stores a voltage equal to E4. Then, during the second carrier envelope at A, the carrier oscillation II at E, oscillating constantly at θ3, is amplitude modulated by the steady state voltage E4, and finally envelope-shaped, such as described by way of the transmitter of Fig. 3, for radiation. This operation continues alternately between oscillations I and II, for continuous production of the carrier envelopes, as illustrated.

The pulses for operating various gate circuits to effect oscillatory phase shifts, and the samplers, for discharging and charging storage condensers, are shown in their proper time sequence at G to L in the drawing. For example, the pulses at G operate gate circuits, through which modulating signals are admitted for shifting the phase angles of oscillation I. The pulses at H operate a discharging element for discharging a storage condenser in sampler at D. And the pulses at I operate a charging element to store a proportional signal quantity in a storage condenser, in sampler at D. The pulses at J to L are produced in alternate sequence with regard to the pulses at G to I, in order to effect alternate operation of the samplers in first and second branches of the transmitter in Fig. 4, for continuous production of the carrier envelopes.

Figure 13:
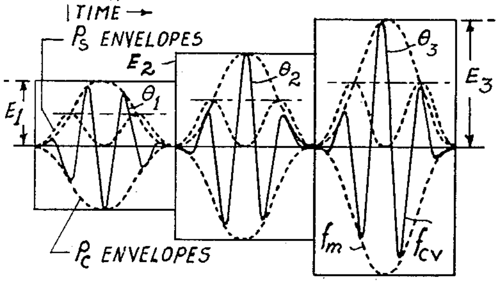
Figure 14:
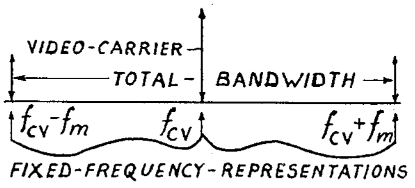

In Fig. 4, the pulse producers are shown by the blocks 22 and 23. These pulse producers may be arranged in various forms, but the arrangement shown in my Patent No. 2,558,489 issued June 26, 1951, Fig. 13 and by the illustrated pulses at 14e in Fig. 14 will be found suitable for the purpose.

Figure 1:
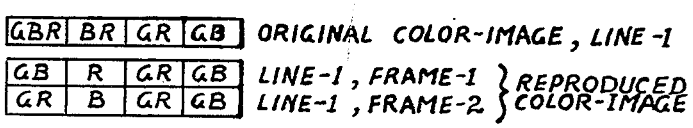
Figure 1A:
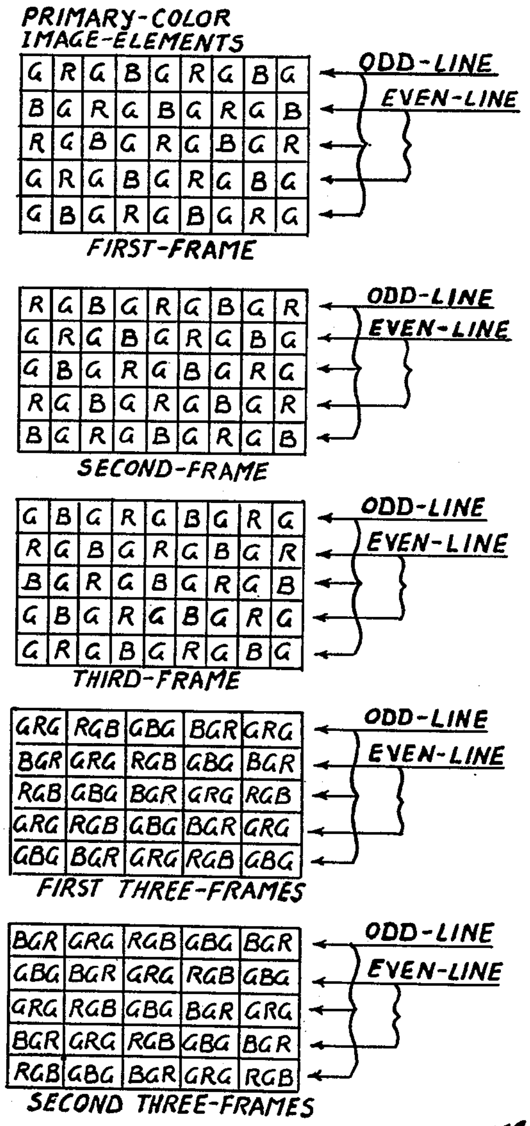

With reference to the color sequence shown in Fig. 1*a*, it was described in the foregoing that, a saturation control must be included for the green primary color, in alternate time-division periods. This is achieved by doubling the frequency $f_m/2$ to $f_m$ in block 24 (which will contain frequency modulation representative of the sound wave; but the modulator is not shown in Fig. 4, for simplicity of drawing); half wave rectifying in block 25; and applying the periodic output voltages upon the green video source to control the gain of these signals.

With reference to color-sequence reversal, it will be noted in the arrangement of either Fig. 3 or Fig. 4 that, during phase-shifting periods of oscillations I and II, the combined output voltage of amplitude-limiters 8 and 9 must remain constant; either on or off, so as to avoid cross-switching between the red and blue video signals. The steady conditions of limiters 8 and 9 is easily achieved by time dividing the original video signals in phase with the sampling periods, and waveshaping these time-divided signals in the video amplifiers, such as by the arrangements in ordinary video amplifiers, to ensure that during carrier-phase-shifting and/or sampling periods the statistic video signals do not change from one light level to another. This is shown in Fig. 4, wherein, the output of block 24 is full-wave rectified into unidirectional pulses, and applied upon the three video-signal sources for time division of the signals.

*Phase modulated sync pulses*

Figure 6:
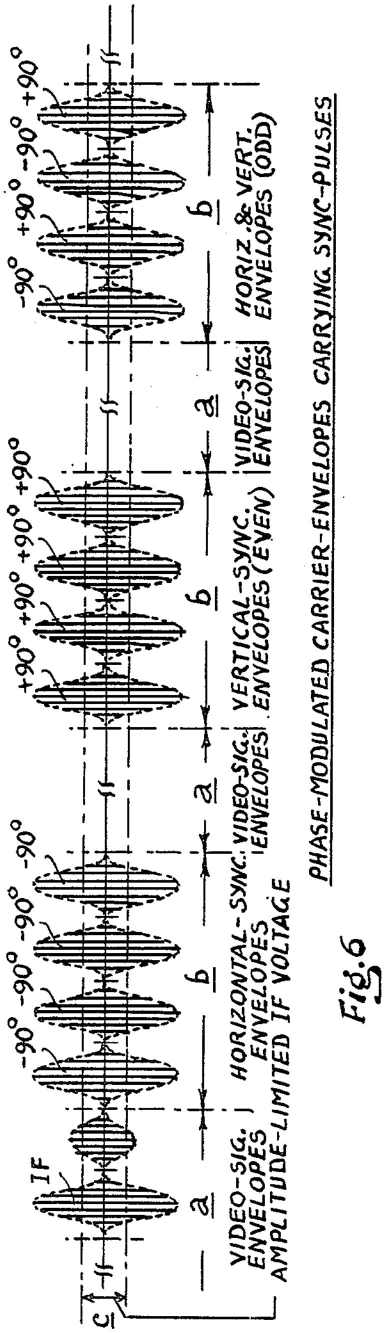
Fig. 6 illustrates waveforms of the modulated carrier wave, in which phase modulation is utilized to convey picture-synchronizing signals.

In the drawing of Fig. 6, there is shown a waveform of the time-divided carrier envelopes, wherein the time areas *a* are devoted to the conveyance of video signals, and the time areas *b* are devoted to the conveyance of synchronizing pulses. In the first section of areas *b*, the carrier phase is shifted 90 degrees backward in every succeeding envelope; representing the horizontal synchronizing pulse. In the second section of areas *b*, the carrier phase is shifted 90 degrees forward in every succeeding envelope; representing the vertical synchronizing pulse; for even-line. And the third section of areas *b*, the carrier phase is shifted backward and forward sequentially from envelope to envelope; representing simultaneous horizontal and vertical pulses; for odd-line. The number of carrier envelopes during each synchronizing pulse is of no importance, but it is dependent upon the duration of the phase-modulating pulse at the transmitting end.

*Phase discriminator for video-signals and for horizontal-vertical sync pulses*

Figure 7:
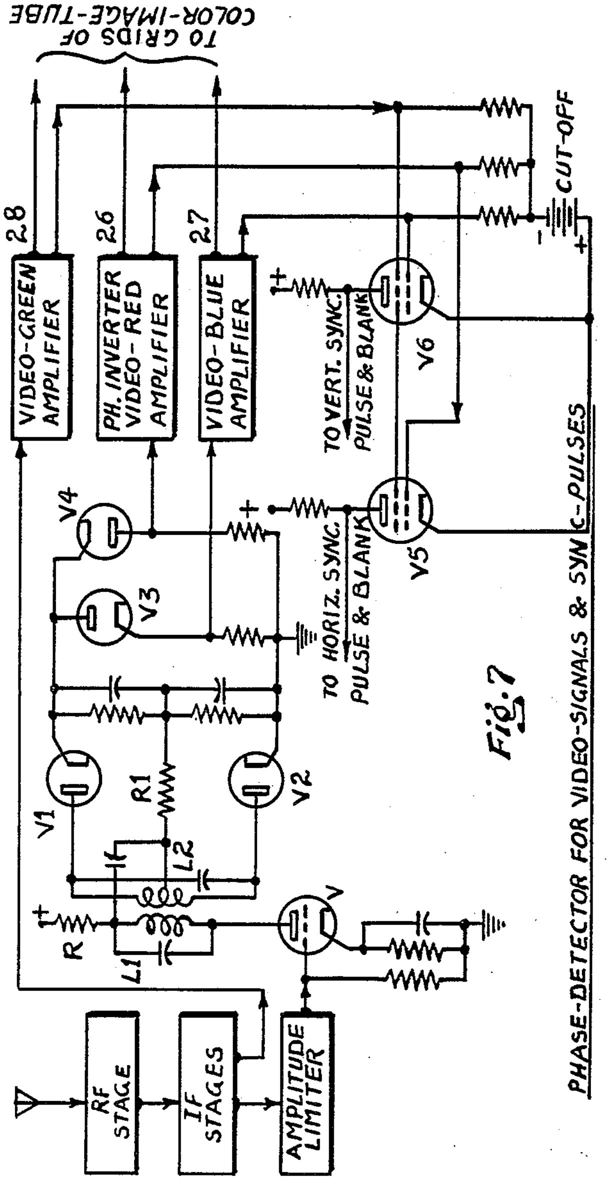
Fig. 7 is an arrangement for detecting phase-modulated signals.

In the first step of detecting the phase modulated carrier wave, the amplitude variations of the carrier envelopes are limited as indicated by the dot-and-dashed lines *c*, in Fig. 6. When the carrier envelopes are thus limited in amplitude, the output will be (disregarding the narrow dips between the envelopes) as if the carrier were of constant amplitude, and that the phase angle were shifted abruptly in time-division steps. This type of phase modulation is detected by the phase discriminator circuit given in Fig. 7. The general circuitry is similar to the well known Seely type of frequency discriminator, except that, the anode circuit of amplifier tube V comprises a resistance R, in series with the resonant circuit L1, the latter of which has a phase-resolution time constant equal to one time-division period. Thus, at the beginning of each time-division, the carrier phase in R and L1 will differ by an angle that is a function of the incoming video signal; this phase difference gradually resolving into in-phase relation at the end of each time-division. Due to the normal quadrature phase relation between L1 and L2, and therefore normal quadrature phase relation between the voltages across R1 and L2, and also due to the symmetric connections of diodes V1 and V2, the voltage from cathode terminal to ground will normally be zero. When the incoming carrier shifts its phase in forward direction, the cathode terminal of diode V1 will be more negative than at the cathode terminal of V2. Whereas, when the phase shifts in backward direction, the cathode side of V1 will be more positive. These positive and negative output voltages are further rectified by diodes V3 and V4, so as to obtain independent output signals representing video signals of different primary colors, which are amplified by the video amplifiers in blocks 26 and 27. The amplitude modulated video signals (green primary-color in this case) are amplitude detected (not shown in the drawing), and amplified by the video amplifier in block 28; the outputs of the three video amplifiers are then applied upon the control grids of a color-image reproducing device.

For the separation of picture synchronizing pulses, the outputs of video amplifiers 26 and 27 are separately applied upon one of the control grids of multicontrol electron tubes V5 and V6, which are normally biased to anode current cut-off. The output of video amplifier 28 is applied upon the other control grids of these tubes in parallel. Due to the extreme negative bias applied upon the control grids of these gate tubes, anode current flows only when positive voltages are applied to both control grids simultaneously. Thus, when the amplitude of the video carrier is raised above a predetermined level at the transmitting end, assigned as synchronizing-amplitude-level, the output voltage of video amplifier 28 raises the potentials upon the second control grids of gate tubes V5 and V6 to the operating point, so that the phase-modulated synchronizing pulses from the outputs of video amplifiers 26 and 27 operate one or both of the gate tubes for picture synchronization. The amplitude rise of the carrier wave to synchronizing level is achieved by the arrangement shown in Fig. 3, wherein, the block designated as "sync pulse" applies negative pulse to the source of green video signals to render it inoperative, and applies positive pulse to the AM samplers 15 and 16 to raise the carrier amplitude level. This arangement is not shown in Fig. 4, for simplicity of drawing.

*Phase modulator of sync pulses*

Figure 9:
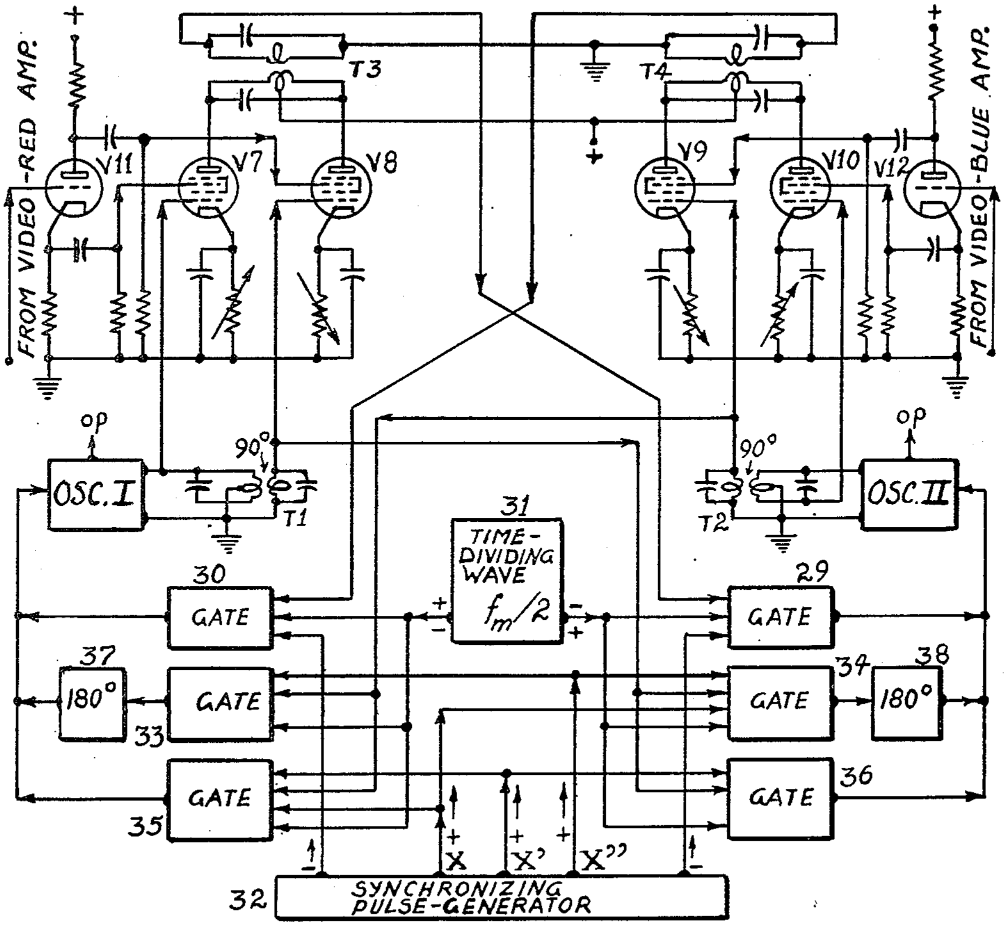
Fig. 9 is a block diagram of the phase modulator for synchronizing signals.

Fig. 9 is a modification of the block diagram in Fig. 3 or 4, but in this case, only phase modulation is shown. The outputs of oscillators I and II are split in phase 90 degrees by the transformers T1 and T2, and applied independently upon the control grids of phase modulator tubes V7, V8 and V9, V10. The cathode bias of modulator tube V8 is so adjusted that the tube normally operates at its maximum transconductance. Whereas, the cathode bias of tube V7 is so adjusted that the tube normally operates at its minimum transconductance; these adjustments being such that, the $G_m$ curve between maximum and minimum is substantially linear. Thus, the anode circuit of tube V8 normally contains maximum oscillatory current, and the anode of tube V7 normally contains minimum oscillatory current. The anode circuit, comprising transformer T3, further shifts the phase angle of the output wave by 90 degrees, and applies upon the oscillator II, in the same phase angle as it originated in the oscillator I. When the positive video red signal arrives at the control grid of cathode follower and phase inverter tube V11, the video signal is applied upon the second control grid of V7 in positive polarity, and upon the second control grid of V8 in negative polarity. In this manner, the transconductance of tube V7 is increased, and the transconductance of tube V8 is decreased, with the result that the phase angle of oscillation I in transformer T3 is shifted forward in its application upon the oscillator II. The operation of phase modulator tubes V9 and V10 is similar to the operation of V7 and V8, but in this case, the blue phase-modulated oscillation II retards the phase angle of oscillation I, by reason of the inverted connection of transformer T2.

The output oscillation of I after being phase modulated by the red video signal, it is applied upon the oscillator II, through gate 29, while the output oscillation II after being phase modulated by the blue video signal, it is applied upon the oscillator I, through gate 30. The gates 29 and 30 are operated in alternate time periods by the alternate positive half-cycle voltages of the time-dividing wave produced in block 31. For the video-signal modulation, the output of oscillator I (at *op*) contains periodic steady state phase modulations representative of the video blue signals, and the output of oscillator II (at *op*) contains periodic steady state phase modulations representative of the video red signals; in sequence with respect to each other. In the case when image-multiplexing is employed, such as described by way of the illustration in Fig. 5, and the block arrangement of Fig. 4, then the oscillations I and II are time divided by the blocks 22 and 23, of Fig. 5.

The synchronizing pulses are generated in positive polarity at the output terminals X, X′ and X″ of block 32; in the form as shown in Fig. 9. Simultaneously with these pulses, there are produced pulses in negative polarity, as indicated at the extreme end terminals of block 32, which are applied upon the gates 29 and 30 to render them inoperative, and prevent the signal modulation from interfering with the pulse modulation. The gates 33, 34 and 35, 36 are normally rendered inoperative, and are so arranged that, they operate only when simultaneous positive voltages are applied upon, by the alternate positive half-cycle voltage of the time-dividing wave in block 31 and the positive pulse from the pulse generator 32. The output oscillation I after being 90° phase-retarded by the transformer T1 is applied upon the inputs of gates 34 and 36 simultaneously, while the output oscillation II after being 90° phase retarded by the transformer T2 is applied upon the inputs of gates 33 and 35 simultaneously. The output voltages of gates 33 and 34 are phase inverted by the blocks 37 and 38, so that when the gates 33 and 34 are operated alternately by the simultaneous synchronizing positive-pulse from block 32 and alternate half-cycle positive-voltages from block 31, the oscillations I and II will be advanced in phase by 90 degrees in every succeeding half-cycle periods of $f_m/2$. The outputs of gates 35 and 36 are applied in phase upon the oscillations I and II, so that when the latter gates are operated, this time the oscillations I and II will be retarded in phase by 90 degrees in every succeeding alternate intervals of the wave $f_m/2$. When however, the pulse generator applies a positive pulse upon gates 34 and 35 simultaneously, the oscillation II passing through gate 35 retards the phase angle of oscillation I, and the oscillation I passing through gate 34 advances the phase angle of oscillation II, causing sequential phase-retarding and phase-advancing of the carrier wave from envelope to envelope. In this case, and with reference to the phase discriminator in Fig. 7, both the vertical and horizontal scannings are acted upon simultaneously, for odd-line field scanning.

*Sequence of sync pulses*

Figure 8:
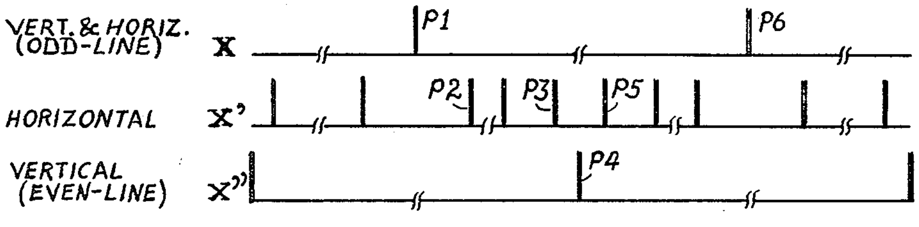
Fig. 8 illustrates the sequence of pulses representing the vertical and horizontal synchronizing signals for operating the arrangement of Fig. 9.

The distribution sequence of horizontal and vertical pulses is shown in Fig. 8. At P1, both the vertical and horizontal pulses at X are present simultaneously (by way of cross-connection in the block diagram of Fig. 9), for odd-lines. From this point on, the horizontal pulses P2 at X′ continue. Between the last two pulses, P3 and P5 of the odd-line field, the vertical pulse P4 is produced at X″; for even-lines. From this point on the horizontal pulses continue, until at the last horizontal pulse P6, where both the horizontal and vertical pulses appear at X, for a new start of the odd lines.

*Receiver*

It had been explained in the foregoing that, the time of transmission allotted for each individual image-signal is one complete time-divided envelope period. Thus, the band pass of the I. F. circuit may be 3 mc. wide, instead of 6 mc. wide. However, due to the simultaneous phase modulation of the carrier, it was explained that the I. F. carrier is built up in free state and dissipated forcefully in alternate time-divided periods in two low-decrement branches, so as to avoid envelope distortion due to phase delay in the low-decrement circuit. This is achieved by the arrangement given in Fig. 10.

Figure 10:
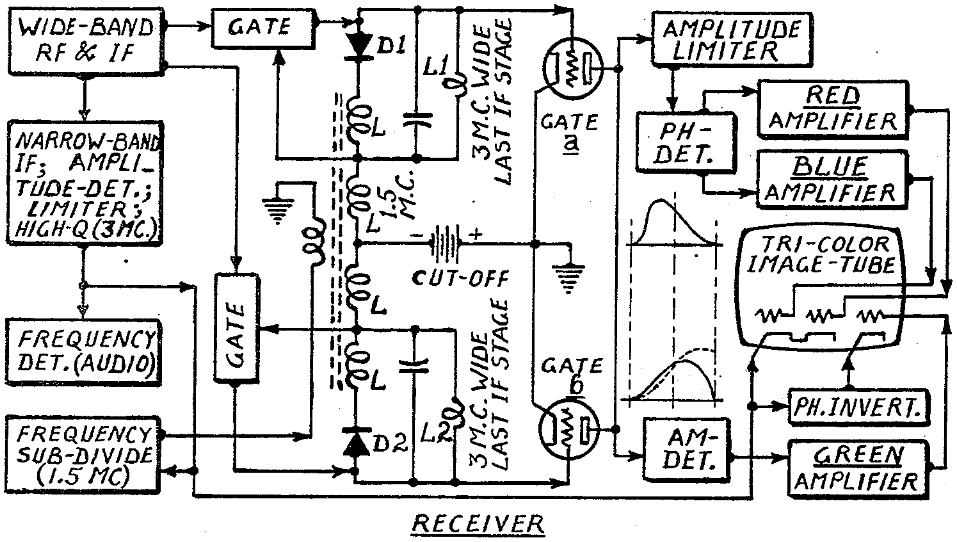
Fig. 10 is partly block and partly schematic diagram of the receiver in accordance with the invention.
Figure 11:
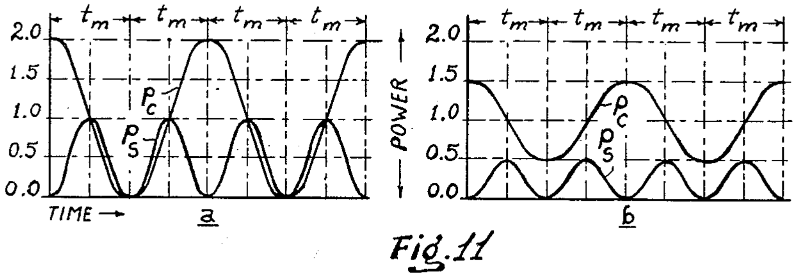

In Fig. 10, the incoming wave is passed through wide-band R. F. and I. F. stages, the output of which is applied upon two separate high Q tuned circuits L1 and L2. The high frequency oscillatory voltage across coils L1 and L2 is passed through the gate tubes *a* and *b* during alternate half-cycle voltages across L, at a frequency of 1.5 megacycles. The poles across coils L, as well as the diodes D1 and D2 are so arranged that, when gate *a* is switched on, the diode D1 is idle, and coil L1 starts building proportional amplitude of oscillatory voltage, while gate *b* is switched off, and diode D2 damps out the oscillatory voltage across coil L2, and vice versa. The periodic outputs of coil L1 and coil L2 are then combined at the outputs of gates *a* and *b*, for amplitude and phase detection.

Due to the slow rising oscillatory current in coils L2 and L1, the peak of the output envelopes will shift to the right, as shown by the dotted curve immediately above block diagram of the AM-detector. Then, by the gated action, the curve is changed to the form as shown by the solid line. When the combined outputs of coils L1 and L2 are phase detected, after passing through the amplitude limiter, as shown, the peak of the envelope will shift to the left, as shown by the curve immediately below block diagram of the PH-detector. This condition was explained by way of the phase detector of Fig. 7. The oppositely peak-displaced output voltages of the amplitude and phase detectors are then switched on and off, either at the video amplifiers, or the three individual control grids of a tri-color image reproducing tube, by the alternating wave at 3 megacycles. In the drawing, outputs of the phase detector are amplified by the red and blue video amplifiers, and output of the amplitude-detector is amplified by the green video amplifier. Outputs of these video amplifiers are independently applied upon the control grids of a tri-color image reproducing device, to effect the final color-picture. For switching purpose, the three control elements of this image device are normally so biased that, they operate by the video signals only when switching positive voltages are applied upon said elements. To effect such an operation, alternate half cycle potentials of the wave at 3 megacycles is shown applied directly upon the first two cathodes in parallel, and applied upon the third cathode through the phase inverter for alternate switching.

The time-dividing wave is derived from the incoming I. F. wave, which is first passed through a circuit sharp enough to cancel out the adjacent channel; amplitude detected; amplitude limited; and passed through a high Q circuit to produce the 3 megacycle wave, which is used to switch the cathodes of the tri-color image device. The 3 megacycle wave is then sub-divided into 1.5 megacycles, which is used to switch the I. F. coils L1 and L2. The high Q circuit just mentioned is broad enough to pass the original frequency modulation by the sound waves, and likewise, the sound wave is also derived from the output of this high Q circuit.

While I have described what is at present considered the preferred embodiment of the invention, it will be obvious to the skilled in the art of electronics that, various substitutions of parts, adaptations and modifications are possible, without departing from the spirit and scope thereof. Moreover, I wish it to be understood that the present invention is a modification and continuation of my related patents and applications: Patent No. 2,558,489 issued June 26, 1951 (disclosing a new type of color television); Patent No. 2,587,734 issued March 4, 1952 (disclosing a waveshaping and modulator tube); copending application Serial No. 752,601 June 5, 1947, now Patent No. 2,611,826 September 23, 1952 (disclosing a method of simultaneous AM and PH modulation with economy in bandwith); Serial No. 3,318 January 20, 1948, now Patent No. 2,615,986 October 28, 1952 (disclosing a new type of phase modulation); Serial No. 236,262 July 11, 1951, now Patent No. 2,663,756, December 22, 1953 (disclosing a system of synchronization in color television); Serial No. 260,682 December 8, 1951, now Patent No. 2,666,806 January 19, 1954 (disclosing an improved modification of color television). Accordingly, the various features and claims of which that may not have been included herein, are hereby made part of this invention as if fully included herein.

I claim:

1. In color television, the system of multiplex modulation in a restricted bandwidth, which comprises in combination means for producing a carrier wave, means for producing a time-dividing wave, means for producing sound signals, a frequency modulator and means therefor to frequency-modulate the time-dividing wave by the sound signals, means for producing video signals representative of first; second; and third primary colors, means for time dividing the video signals by said frequency-modulated time-dividing wave, means for time dividing the carrier wave by the frequency-modulated time-dividing wave into individual envelopes in phase with the video-time-divisions, an amplitude shifter and means therefor to shift the amplitude of succeeding carrier envelopes corresponding to the time-divided video signals of the first primary color, phase shifter and means therefor to shift phase angle of the carrier in succeeding second envelopes by angles representative of time-divided video signals of the second primary color; each of said phase shifts being substantially in steady state step from boundary to boundary of the envelope, whereby to avoid effective frequency modulation of the carrier, means for shifting phase angle of the carrier in succeeding other second envelopes by angles representative of the time-divided video signals of the third primary color in the preceding manner, whereby the final modulated carrier will contain sound and composite video signals distinguishable one from another, means for waveshaping the amplitude rise and fall of every succeeding carrier envelope approximating to that of the sine-squared function; the carrier amplitude at the boundaries of each envelope being negligibly low, whereby first to avoid appreciable sudden transient effect of the carrier wave due to sudden amplitude and phase changes at the boundaries, and second to avoid widely expanded multiple pairs of complementary sidebands that are usually associated with steep sided rise and fall of the carrier envelopes, and thereby to restrict the total bandwidth to twice the time-dividing frequency plus the spectrum band that is occupied by frequency-modulation by the sound waves, and means for transmitting same.

2. As set forth in claim 1, which includes in combination means for reversing the sequence of modulation of said second and third primary colors at random elemental periods, depending upon which of the second and third primary colors is present during each of said time-dividing periods, whereby greater portion of the time devoted to conveying video signals of the second and third primary colors is utilized.

3. The system as set forth in claim 1, which includes in combination means for conveying picture synchronizing signals comprising means for blanking out said video modulations during normal picture-synchronizing intervals, means for raising the amplitude of said carrier envelopes to a level assigned to convey picture-synchronizing signals, phase shifting means for shifting the phase angle of the carrier in succeeeding envelopes in said stepwise manner; in first direction representative of horizontal synchronizing signal, means for shifting phase angle of the carrier in succeeding envelopes in said stepwise manner; in a second direction representative of a vertical synchronizing signal, namely for even-line scansion, and means for shifting phase angle of the carrier in succeeding envelopes in said stepwise manner; in alternate sequence of said first and second directions representative of a vertical synchronizing signal, namely for odd-line scansion, whereby the final modulated carrier wave will contain sound; composite video; and picture-synchronizing signals, all distinguishable one from another.

4. The system as set forth in claim 1, which includes in combination means to receive and detect the composite modulated signals that are transmitted in said restricted bandwidth, as in the following: means to receive the transmitted carrier wave, means to convert the received wave into secondary carrier wave, a low-decrement circuit tuned to the secondary carrier wave and means therefor to derive said time-dividing wave containing said frequency modulation representative of said sound signals, a frequency-detector and means therefor to detect the frequency modulation, thereby to reproduce the sound signals, first and second relatively low-decrement circuits tuned to the secondary carrier wave, means to apply last said wave upon the first and second tuned circuits, a first gate leading to; and first diode connected across said first circuit, a second gate leading to; and second diode connected across said second circuit, means to operate said first and second gates and said first and second diodes in alternate sequence by said derived time-dividing wave, in such phase that, when the first gate is operative the first diode is inoperative, while the second gate is inoperative and the second diode is operative, whereby said secondary carrier wave is built up proportionally in the first circuit, while previously built up oscillatory wave in the second circuit is damped out forcefully by the second diode and vice versa, a third gate at the output of said first circuit, a fourth gate at the output of said second circuit, a means to operate last said gates in alternate sequence in phase with the first and second gates respectively, thereby to allow passage of signals only during said building-up periods to a common output of the third and fourth gates, an amplitude detector and means therefor to detect the video signals of said first primary color from the amplitude variations of the secondary carrier wave at said common output, an amplitude-limiter and means therefor to limit the amplitude variations of the secondary carrier wave obtained from said common output, a phase detector and means therefor to detect the phase variations of last said limited wave, thereby to obtain said video signals of the second and third primary colors, a tri-color image reproducing device, and means to operate last said device by the detected video signals of first, second and third primary colors in an appropriate manner, for the final reproduction of the original color image.

References Cited in the file of this patent

UNITED STATES PATENTS

| Number | Name | Date |
|---|---|---|
| 2,558,489 | Kalfaian | June 26, 1951 |